US012643359B2

(12) United States Patent
Petrina et al.

(10) Patent No.: US 12,643,359 B2
(45) Date of Patent: *Jun. 2, 2026

(54) CONTROL ARM AND ADJUSTABLE BALL JOINT

(71) Applicant: RB Distribution, Inc., Colmar, PA (US)

(72) Inventors: Jonathan Petrina, Glenside, PA (US); Thomas Reiff, Portage, MI (US)

(73) Assignee: RB Distribution, Inc., Colmar, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/010,885

(22) Filed: Jan. 6, 2025

(65) Prior Publication Data

US 2025/0135820 A1     May 1, 2025

Related U.S. Application Data

(63) Continuation of application No. 18/341,837, filed on Jun. 27, 2023, now Pat. No. 12,187,093.

(51) Int. Cl.
| | |
|---|---|
| B60G 7/00 | (2006.01) |
| F16C 11/06 | (2006.01) |
| B62D 17/00 | (2006.01) |

(52) U.S. Cl.
CPC ............. B60G 7/005 (2013.01); B60G 7/001 (2013.01); F16C 11/0619 (2013.01); B60G 2200/156 (2013.01); B60G 2204/416 (2013.01); B60G 2204/61 (2013.01); B60G 2206/16 (2013.01); B62D 17/00 (2013.01)

(58) Field of Classification Search
CPC .... B60G 7/01; B60G 7/005; B60G 2204/416; B60G 2200/156; B60G 2206/16; B62D 17/00; F16C 11/06; F16C 11/0619
See application file for complete search history.

(56) References Cited

U.S. PATENT DOCUMENTS

| | | | |
|---|---|---|---|
| 2,900,196 A | 8/1959 | Nienke | |
| 2,923,555 A * | 2/1960 | Kost ...................... | B62D 17/00 280/86.756 |
| 6,293,724 B1 | 9/2001 | Spears et al. | |
| 6,478,318 B1 | 11/2002 | Allman et al. | |
| 6,557,872 B1 | 5/2003 | Garrard | |
| 7,513,514 B1 | 4/2009 | Schlosser et al. | |
| 8,544,861 B2 | 10/2013 | Frens | |
| 8,925,944 B2 | 1/2015 | Byrnes | |
| 9,327,570 B2 | 5/2016 | Karpman et al. | |
| 9,751,370 B2 | 9/2017 | Weifenbach et al. | |
| 10,155,424 B1 | 12/2018 | Elterman | |
| 10,450,005 B2 | 10/2019 | Weifenbach et al. | |
| 10,814,535 B2 | 10/2020 | Lee et al. | |
| 10,953,577 B2 | 3/2021 | Lee et al. | |

(Continued)

*Primary Examiner* — James A English
(74) *Attorney, Agent, or Firm* — Volpe Koenig

(57) ABSTRACT

A ball joint assembly for control arm. The ball joint assembly has an upper portion with a ball socket and stud centered about a first centerline. A radial extension that is connected to the upper portion supports a mounting body with a second centerline and an outer diameter that fits within an aperture in the control arm. A threaded shaft depends from the mounting body and receives a nut to tighten against the control arm until the first centerline of the ball joint assembly is fixed in a desired position.

1 Claim, 8 Drawing Sheets

(56)    References Cited

U.S. PATENT DOCUMENTS

| | | | | |
|---|---|---|---|---|
| 11,131,337 | B1 | | 9/2021 | Miller et al. |
| 11,241,928 | B2 | | 2/2022 | Kim et al. |
| 11,491,837 | B2 | | 11/2022 | Kim et al. |
| 11,499,589 | B2 | | 11/2022 | Miller et al. |
| 11,845,316 | B1 * | | 12/2023 | Miller ..................... B60G 3/26 |
| 12,122,211 | B1 * | | 10/2024 | Petrina .................. B60G 7/001 |
| 12,187,093 | B1 * | | 1/2025 | Petrina .................. B60G 7/005 |

* cited by examiner

CONTROL ARM AND ADJUSTABLE BALL JOINT

CROSS REFERENCE TO RELATED APPLICATION

This application is a continuation of U.S. patent application Ser. No. 18/341,837 which was filed on Jun. 27, 2023 and is incorporated herein by reference as if fully set forth.

BACKGROUND

Control arms have been are an important component of a vehicle's suspension since the advent of multi-component suspensions. Control arms allow up and down movement of the suspension while securing the steering knuckles, spindles, and axles to the vehicle and in proper alignment. Control arms have undergone many changes as a result of automotive design and manufacturing technology Most modern control arms are designed to permit adjustments to the vertical alignment or camber of the vehicle's wheels. Camber can be negative, the top of the wheel is tilted in, or positive, the top of the wheel is tilted out. Proper adjustment of camber can be major concern in damage repairs, racing, and the lowering or lifting a vehicle from a stock position.

When one of these conditions arises, the issue is often addressed by installing adjustable control arms to correct the vehicle's camber. However, many of these solutions require the purchase of a particular control arm that addresses the specific, identified problem. This results in there being multiple replacement control arms, which can create supply and inventory problems.

SUMMARY

The disclosed control arm assembly has a control arm frame that mounts to a vehicle and includes an aperture that receives a ball joint assembly. The ball joint assembly has a carrier with a ball joint stud on one vertical axis and a housing with a dependent threaded shaft that is on a second vertical axis. The ball joint assembly is rotatable in the frame aperture for 360 degrees about the second vertical axis. The ball joint assembly is fixed in a desired position by tightening the assembly against the control arm frame.

DETAILED DESCRIPTION

Figure 1:
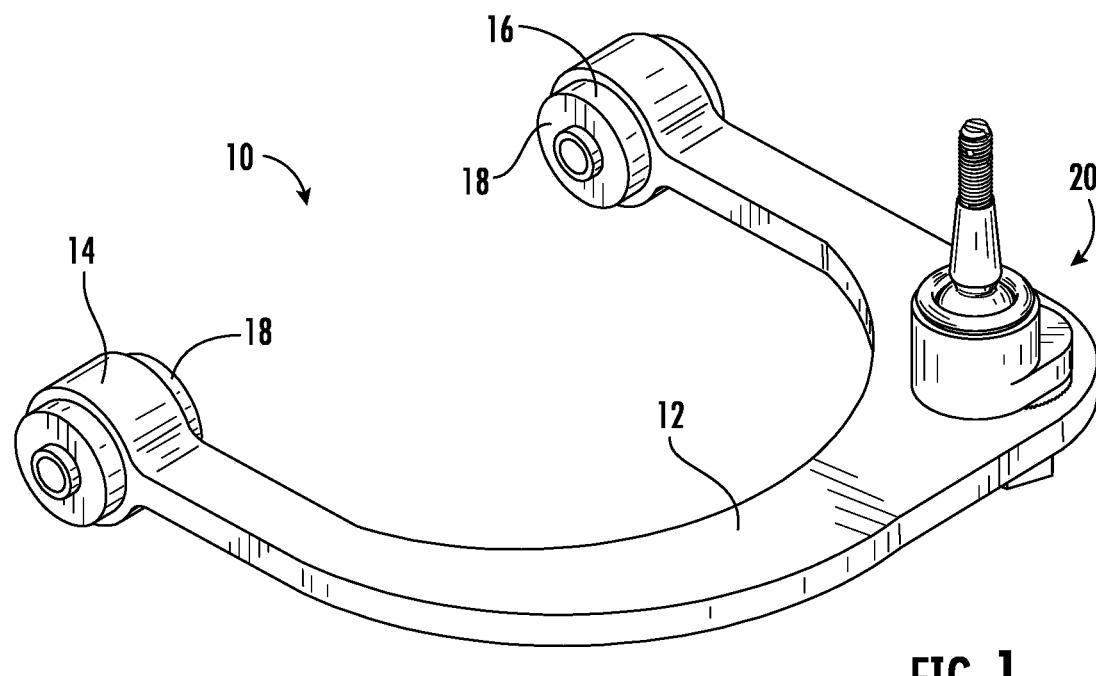
FIG. 1 is a perspective view of an adjustable control arm assembly with a ball joint assembly.

The control arm assembly will be described in more detail with reference to the drawing figures wherein the same numeral identifies the same or similar element throughout.

With reference to FIG. 1, the control arm assembly 10 has a frame member 12, which is illustrated in a general sense with the understanding that the frame member 12 will be configured to the particular vehicle. The free ends 14 and 16 of the frame 12 will have bearing 18 for mounting the control arm 10 to the particular vehicle. The fame 12 will have an aperture, see FIG. 3, for locating a ball joint assembly 20.

Figure 2:
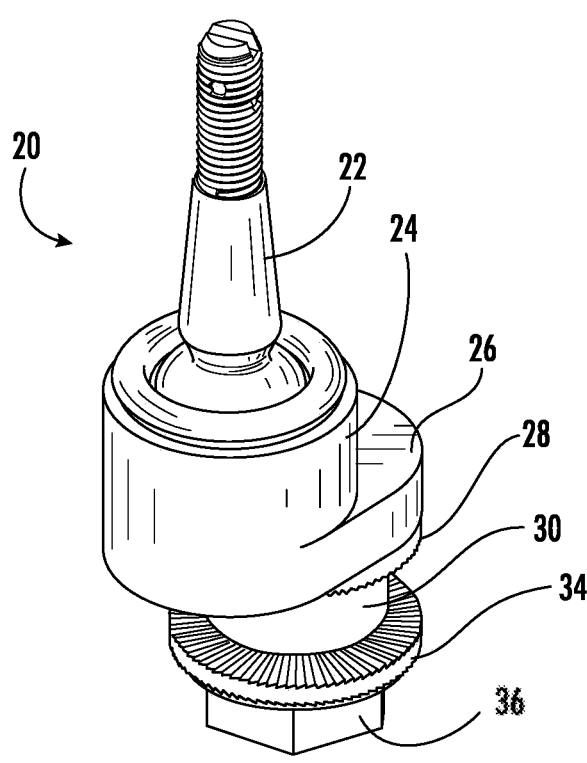
FIG. 2 is a perspective view of just the ball joint assembly.

With reference to FIG. 2, The ball joint assembly includes a ball and stud 22, a ball cup 24, an extended base 26 to the ball cup 24, a first washer 28, a mount 30 for insertion in the frame aperture, a threaded stud 32, a second washer 34, and a fastener 36.

Figure 3:
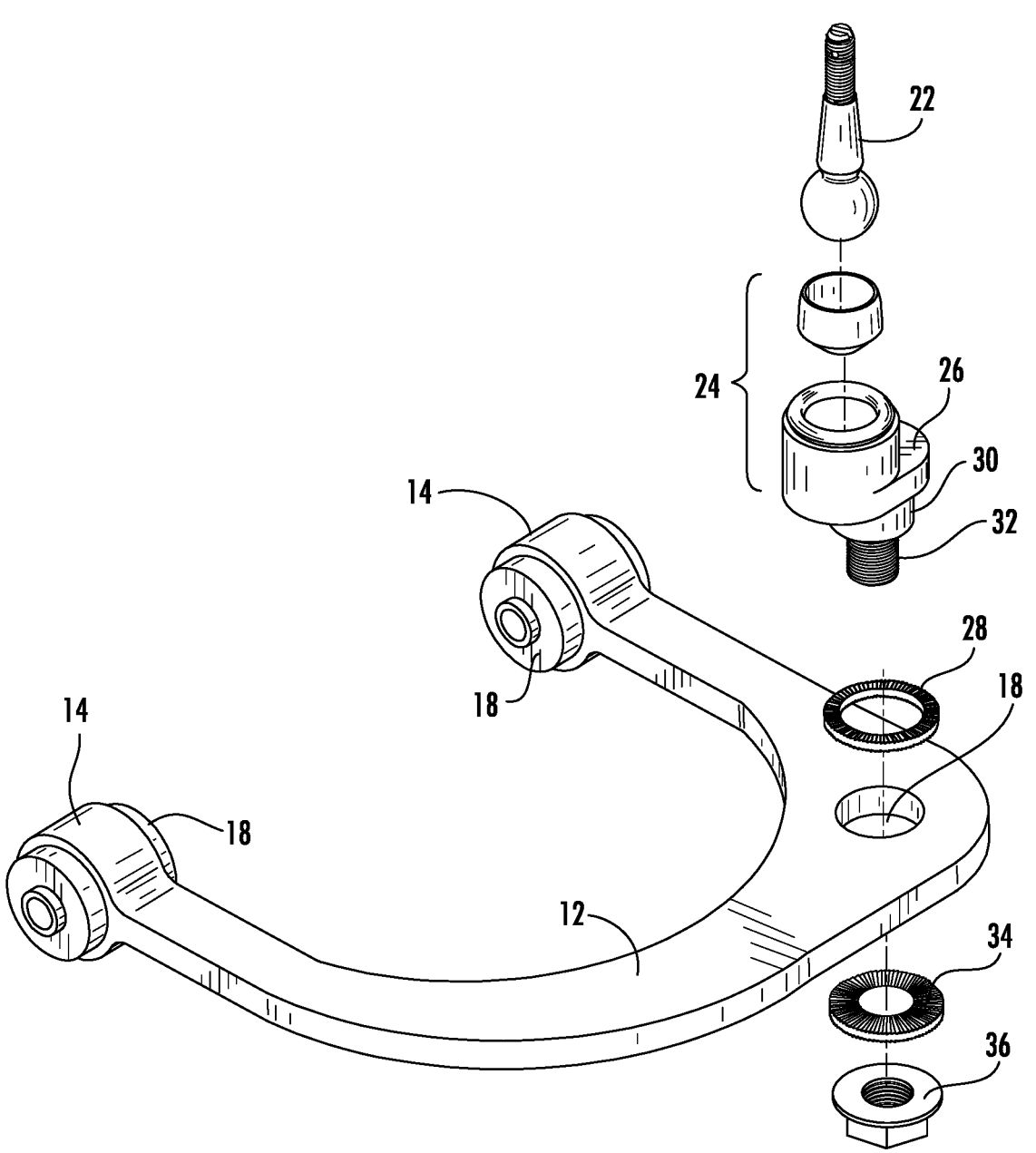
FIG. 3 is an exploded view of the adjustable control arm assembly with a ball joint assembly in FIG. 1.
Figure 4:
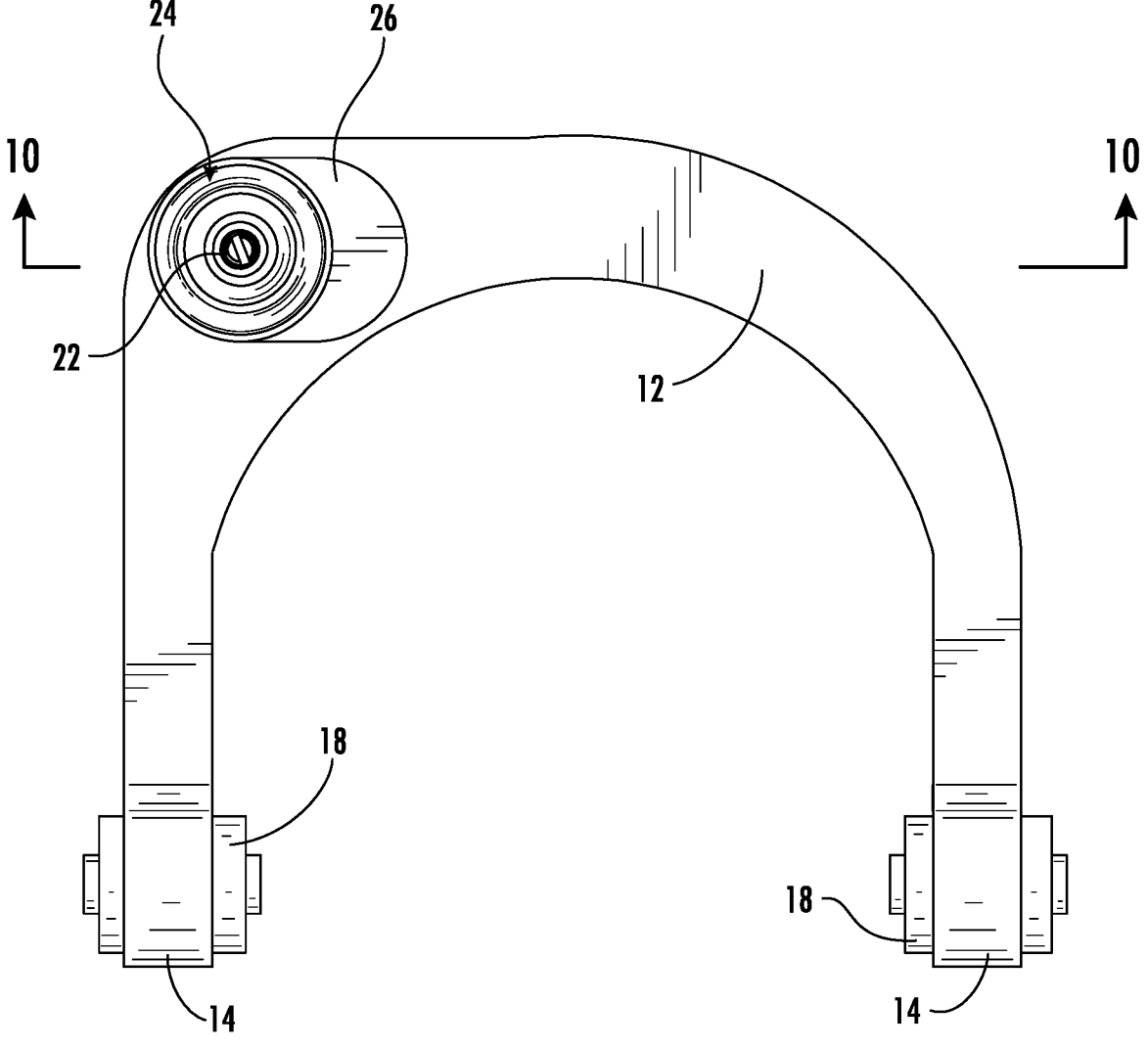
FIG. 4 is a top plan view of the adjustable control arm assembly with a ball joint assembly in FIG. 1.
Figure 5:
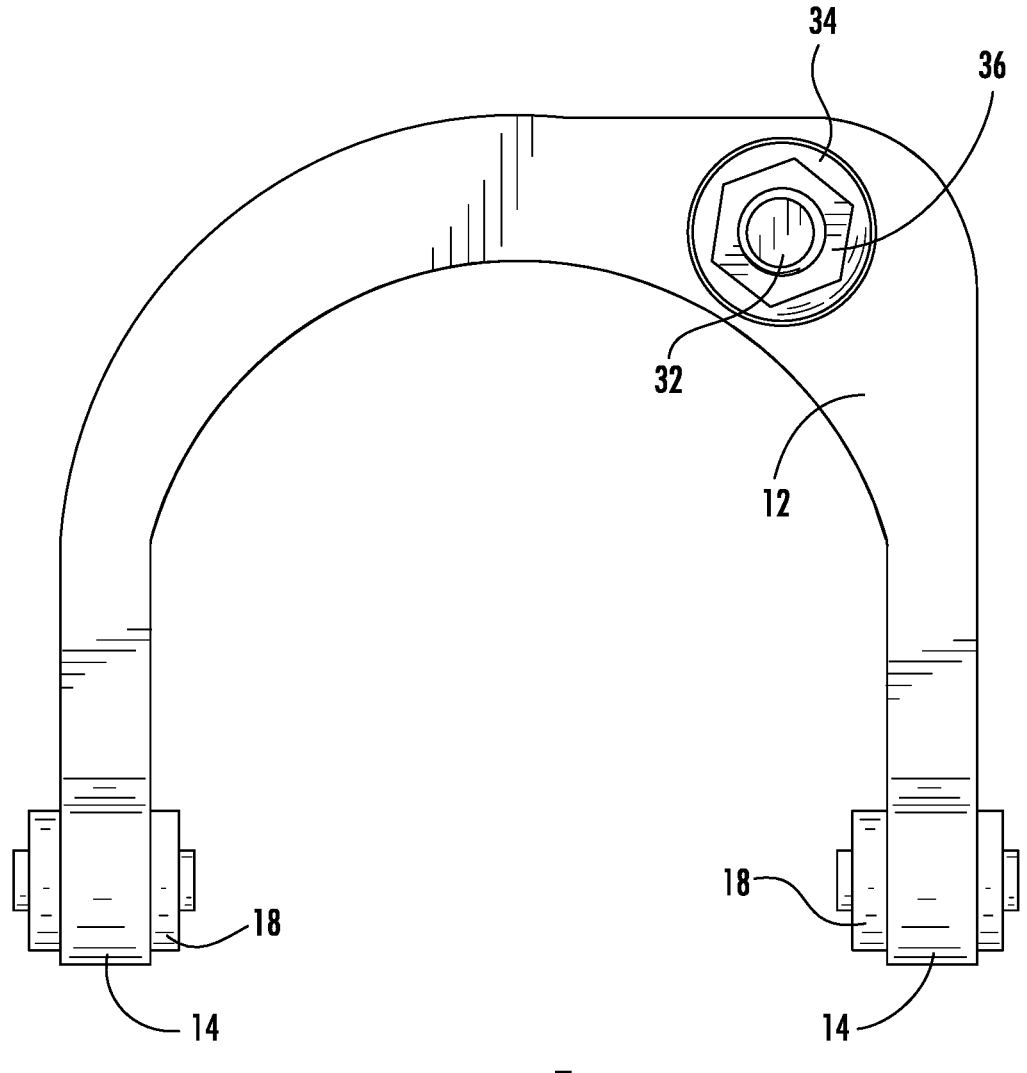
FIG. 5 is bottom plan view of the adjustable control arm assembly with a ball joint assembly in FIG. 1.
Figure 6:
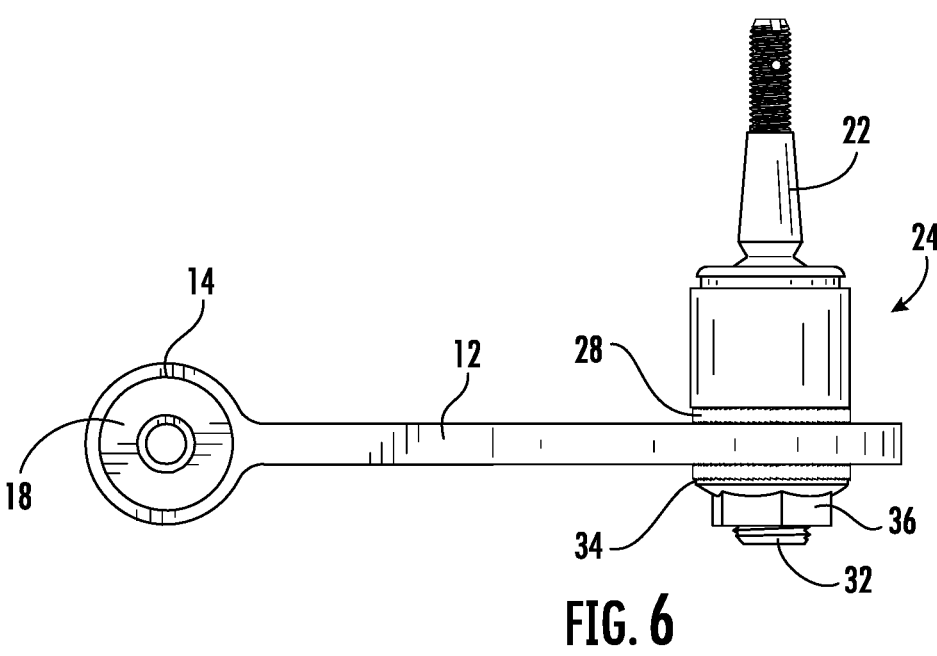
FIG. 6 is a left-side elevation of the adjustable control arm assembly with a ball joint assembly in FIG. 1.
Figure 7:
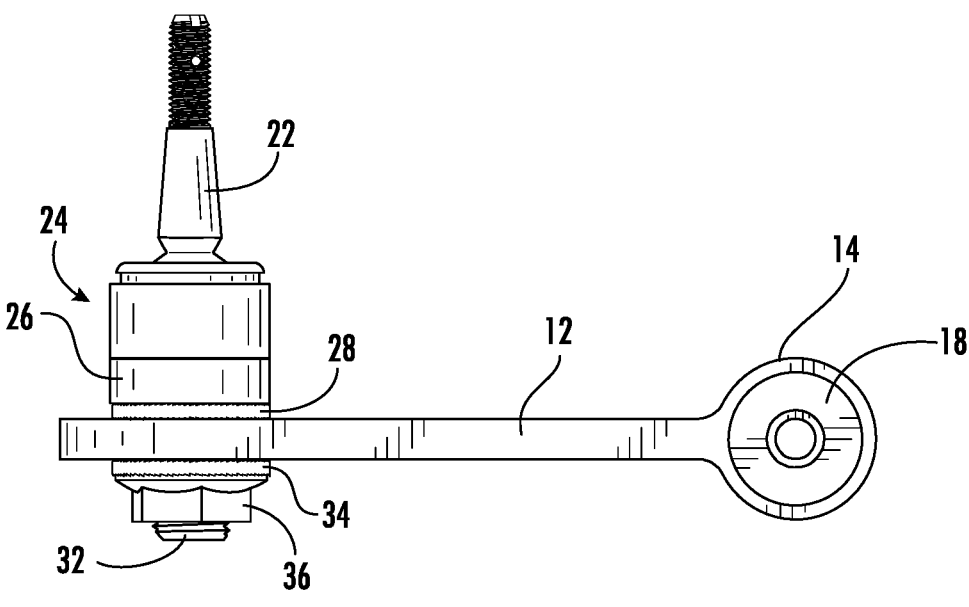
FIG. 7 is a right-side elevation of the adjustable control arm assembly with a ball joint assembly in FIG. 1.
Figure 8:
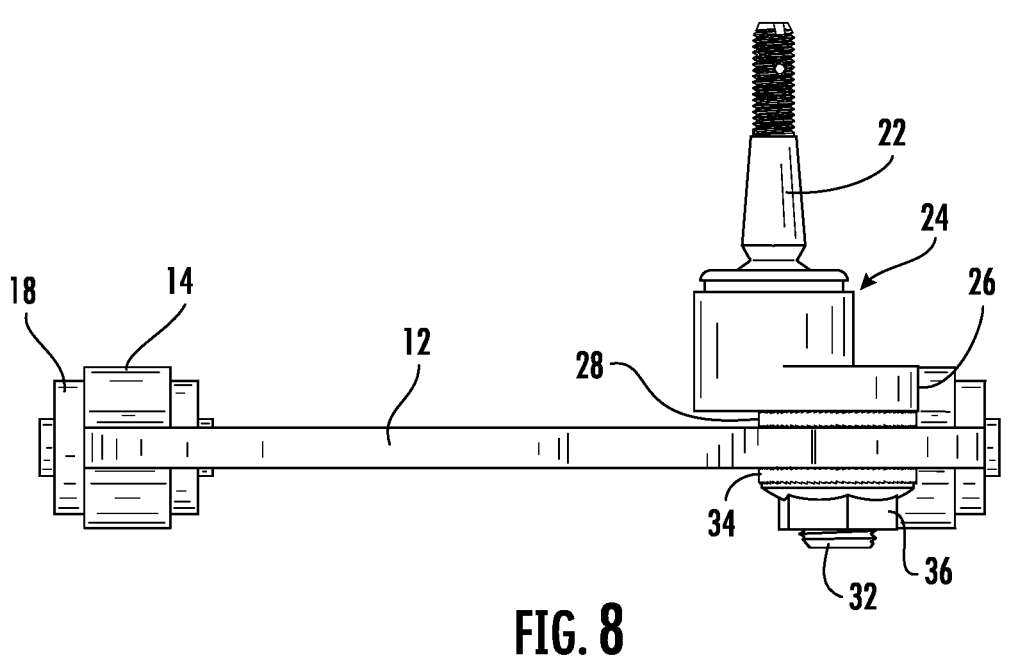
FIG. 8 is a front elevation of the adjustable control arm assembly with a ball joint assembly in FIG. 1.
Figure 9:
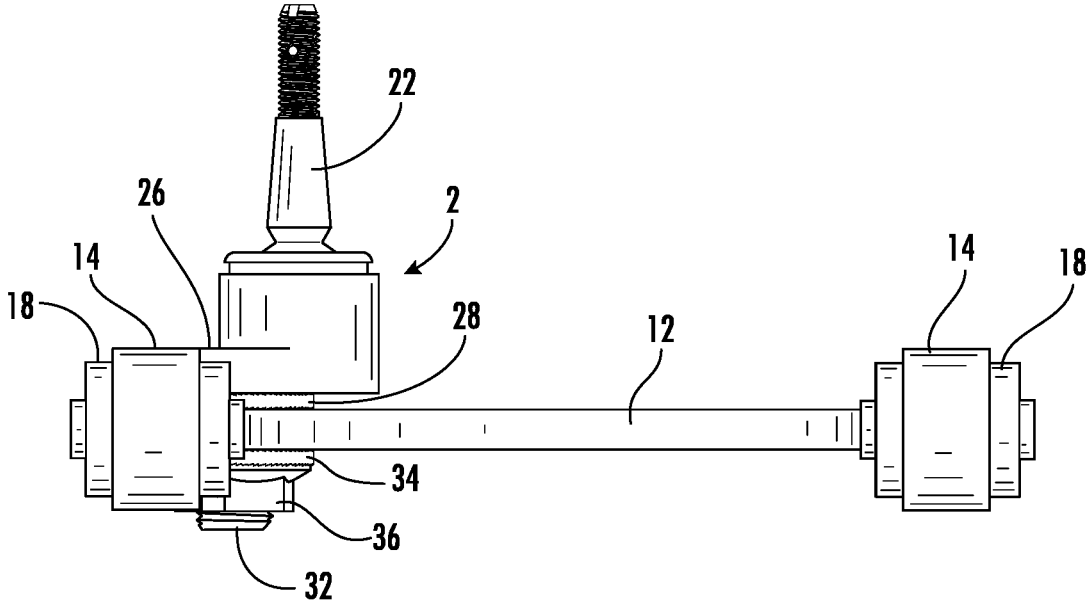
FIG. 9 is a rear elevation of the adjustable control arm assembly with a ball joint assembly in FIG. 1.
Figure 10:
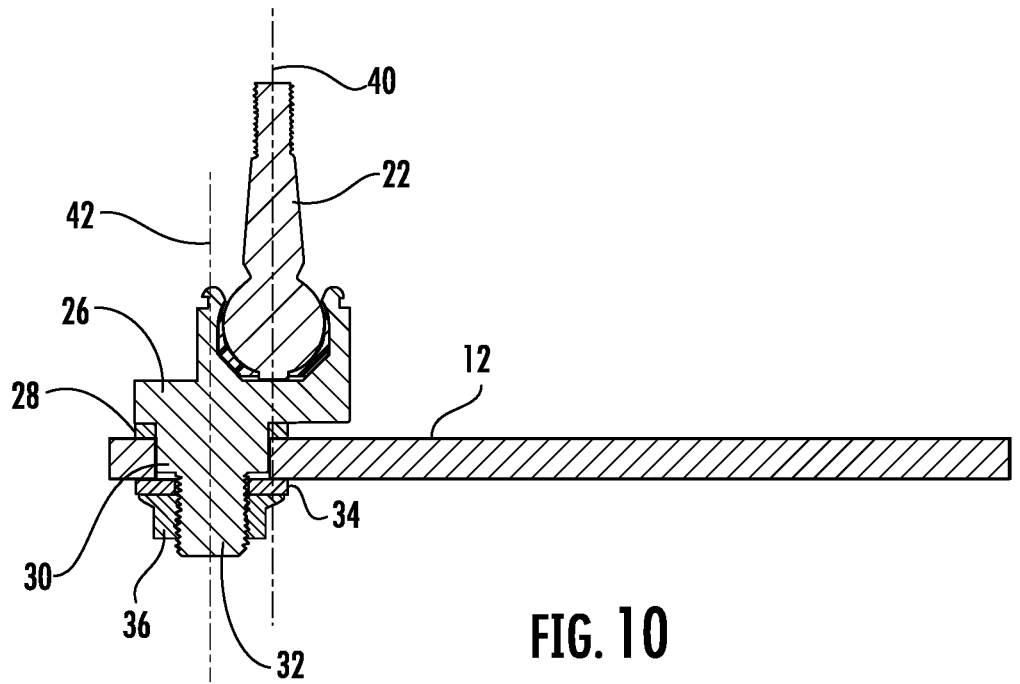
FIG. 10 is a section along the line 10-10 in FIG. 4.
Figures 11, 12:
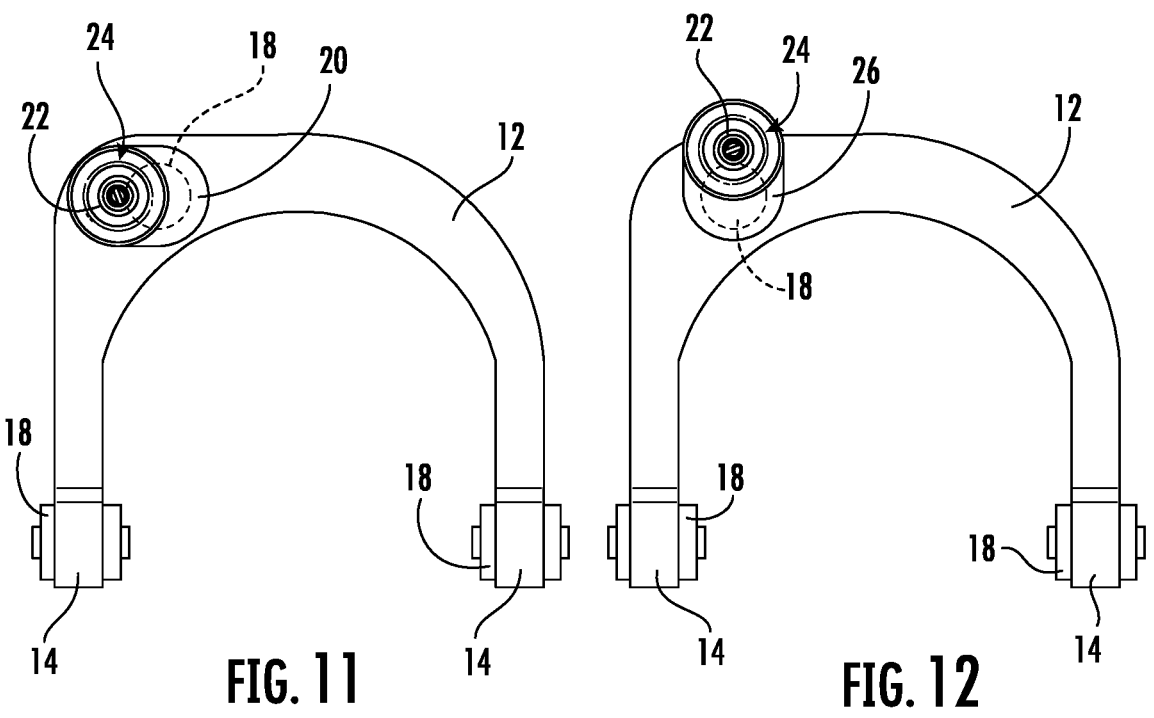
FIGS. 11 through 14 illustrate various positions achievable by rotation of the ball joint assembly within the control arm.
Figures 13, 14:
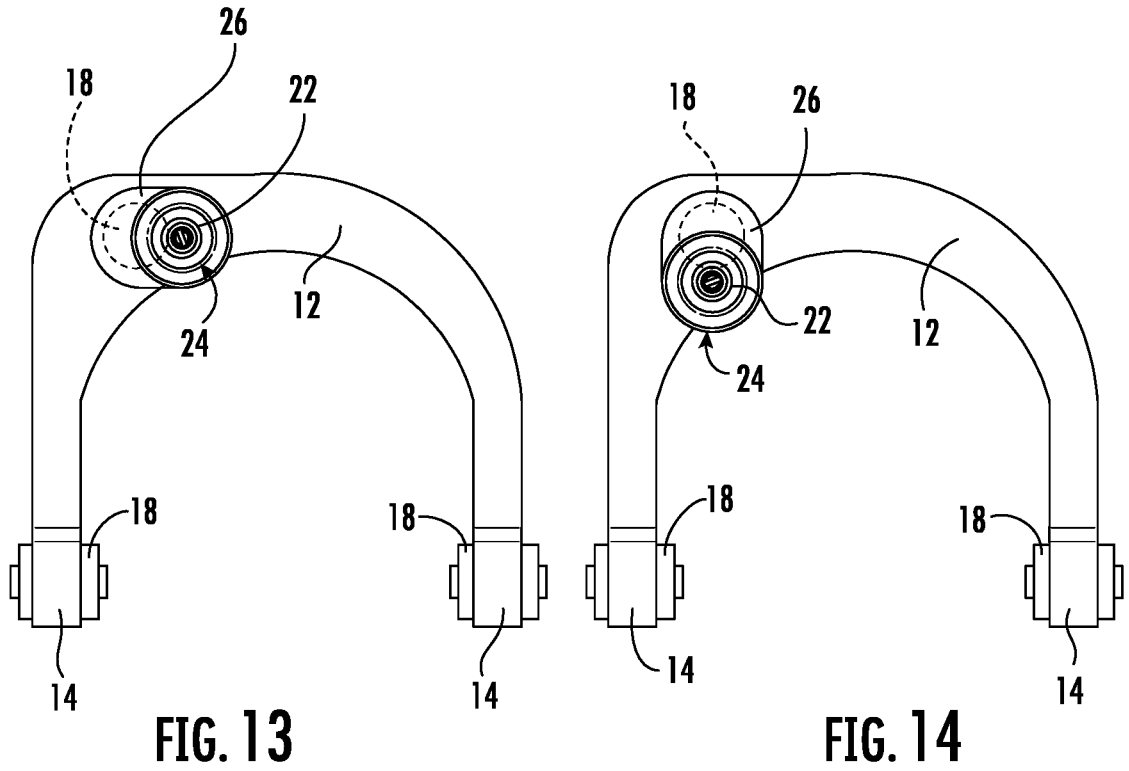

With reference to FIGS. 3, 4, and 10, it can be seen that the mount 30 depends from the cup base 26. The mount 30 has a diameter that is selected to be less than the diameter of the aperture 18 so that the base 30 fits within the diameter of the aperture 18 and be rotatable. The washer 28 has an inner diameter that fits around the mount 30 and an outer diameter that abuts the extended base 26 to the ball cup 24. When the mount 30 is inserted in the aperture 18, the stud 32 extends beyond the frame 12 to receive the second washer 34 and the fastener.

FIGS. 10 through 14 illustrate rotation of the ball and stud 22 with respect to the aperture 18 in the frame 12. As illustrated in FIG. 10, the ball and stud 22 are centered about the center line 40 and the mount 30 is centered about the centerline 42, which is a common centerline with the aperture 18 in frame 12. As illustrated in FIG. 11 through 14, the position of the ball and stud 30 can be varied until the desired location is achieved and locked in place by tightening the fastener 36. The position of the ball and stud 22 can be varied through 360 degrees by rotating the mount 30 about the centerline 42 within the aperture 18 and it is not limited to the positions illustrated in FIGS. 11 through 14. Once the ball and stud 22 are located in the desired position for connection to an associated frame member, the fastener 36 is tightened to fit the ball joint assembly in position. As illustrated, the washer 28 and 34 have irregular surfaces, such as redial grooves, that enhance their grip with the extended base 26 and frame 12 when the fastener 36 is tightened to fix the position of ball and stud 22.

What is claimed is:

1. A vehicle control arm assembly comprising:
   a control arm frame having an aperture with a first diameter;
   a ball joint assembly that is configured for assembly with the control arm frame in the aperture with the first diameter, the ball joint assembly having:
   a ball joint cup that is centered about a first centerline and has a radially extending portion with a mounting body that is centered on a second centerline;
   the mounting body has an outer diameter that complements the first diameter and a dependent threaded stud;
   a first lock washer with an inner diameter that is at least equal to the diameter of the mounting body;

a second lock washer with an inner diameter that is at least equal to an outer diameter of the dependent threaded stud; and, an internally threaded closure that complements the threaded stud;

whereby the ball joint assembly is fixed to the control arm frame at a desired position by tightening the first lock washer and the second lock washer against opposite surfaces of the control arm frame.

* * * * *